(12) United States Patent
Ilincic et al.

(10) Patent No.: US 12,022,281 B2
(45) Date of Patent: Jun. 25, 2024

(54) USER AUTHENTICATION

(71) Applicant: Capital One Services, LLC, McLean, VA (US)

(72) Inventors: Rajko Ilincic, McLean, VA (US); Lin Ni Lisa Cheng, McLean, VA (US); Phoebe Atkins, McLean, VA (US); Deny Daniel, McLean, VA (US); Cruz Vargas, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 73 days.

(21) Appl. No.: 17/355,279

(22) Filed: Jun. 23, 2021

(65) Prior Publication Data

US 2022/0417744 A1 Dec. 29, 2022

(51) Int. Cl.
*H04W 12/06* (2021.01)
*H04L 9/30* (2006.01)
*H04W 12/63* (2021.01)

(52) U.S. Cl.
CPC ............ *H04W 12/06* (2013.01); *H04L 9/30* (2013.01); *H04W 12/63* (2021.01)

(58) Field of Classification Search
CPC .......... H04W 12/06; H04W 12/63; H04L 9/30
See application file for complete search history.

(56) References Cited

U.S. PATENT DOCUMENTS

| 10,785,021 | B1 * | 9/2020 | Prabhat | ................ H04L 9/0863 |
| 2017/0284184 | A1 | 10/2017 | Anghelescu et al. | |
| 2019/0318382 | A1 * | 10/2019 | Yang | ................ G06Q 20/326 |
| 2020/0235931 | A1 * | 7/2020 | Klaiber | ................ H04L 9/0869 |
| 2020/0288535 | A1 | 9/2020 | Sharma et al. | |
| 2021/0153014 | A1 * | 5/2021 | Vanpariya | ................ G06Q 20/40 |
| 2021/0258308 | A1 * | 8/2021 | Avetisov | ................ H04L 9/3234 |
| 2022/0007164 | A1 * | 1/2022 | Sutherland | .......... H04L 63/0853 |
| 2022/0138306 | A1 * | 5/2022 | Marinescu | ............ G06F 21/606 |
| | | | | 726/26 |

FOREIGN PATENT DOCUMENTS

CN 110752914 A * 2/2020
JP 2001222483 A * 8/2001

OTHER PUBLICATIONS

Extended European Search Report issued in correspondence European Application No. 22180274.7 dated Dec. 7, 2022 (11 pages).

* cited by examiner

*Primary Examiner* — Meng Li
*Assistant Examiner* — Lydia L Noel
(74) *Attorney, Agent, or Firm* — Perkins Coie LLP

(57) ABSTRACT

Methods and systems are disclosed herein for secure communication between computing devices. A mobile device may communicate with an untrusted device to cause the untrusted device to send information (e.g., encrypted information that the untrusted device is unable to decrypt) to a server using an Internet connection of the untrusted device. The mobile device may have limited or no access to the Internet. To prevent potential security risks associated with using a public or untrusted device, the mobile device may encrypt information stored on the mobile device (e.g., stored in a mobile application associated with the server), send it to the untrusted device (e.g., by displaying a QR code to a camera of the untrusted device), and the untrusted device may send the information to the server via a network connection of the untrusted device.

20 Claims, 5 Drawing Sheets

| Request | Payload size greater than threshold? | Untrusted device capabilities | Encoding | Encoding Type |
|---|---|---|---|---|
| Action 1 | No | Has camera | Single encoding | Visual |
| Action 2 | Yes | Has camera | Multiple encodings | Visual |
| Action 3 | Yes | Has microphone | Single stream encoding | Audio |

FIG. 2

USER AUTHENTICATION

BACKGROUND

As mobile Internet connectivity has become available in most areas, for many users, mobile devices (e.g., smart phones and electronic tablets) have replaced personal computers as their primary computing device. People do many tasks on their mobile devices that they used to do on their personal computers (e.g., browse the Internet, order food, watch movies, etc.) However, in some instances, mobile devices may have a limited ability to connect to the Internet. For example, a user may travel outside of the area with a network that a mobile device is able to use. Alternatively, the user's data plan may be limited (e.g., the user may only be able to use 2 gigabytes per month) and once the limit is reached, Internet access may be restricted. In these situations, a user may be frustrated without the ability to perform tasks that require use of the Internet. Some systems may try to solve this problem by offering out of network coverage (e.g., for users that are traveling) or supplemental data plans, but these solutions may be inefficient to implement, inconvenient, or too expensive. Alternatively, the user may try using a public computing device (e.g., at an Internet café) to perform a task. However, the user may not want to use public computing devices due to security risks that they pose. For example, a public computing device may have keyboard loggers or the traffic on the network used by the public computing may be intercepted by malicious users.

SUMMARY

To address these and other issues, a mobile device may communicate with an untrusted computing device (e.g., a computer system at an Internet café) and cause the untrusted computing device to send information (e.g., encrypted information that the untrusted computing device is unable to decrypt) to a server using an Internet connection of the untrusted computing device. The mobile device may have limited or no access to the Internet. To prevent potential security risks associated with using a public or untrusted computing device, the mobile device may encrypt information stored on the mobile device (e.g., stored in a mobile application associated with the server), send it to the untrusted computing device (e.g., by displaying a QR code to a camera of the untrusted computing device), and the untrusted computing device may send the information to the server via a network connection of the untrusted computing device.

A mobile device may receive (e.g., via an application on the mobile device) user input indicating a request for a server. For example, the mobile device may receive input on a mobile application indicating that the user would like to download a file from a server. The user may input the information on the mobile device because the user wishes to avoid having to enter any credentials on a public or other untrusted computing device. The mobile device may determine that the mobile device does not have access to the Internet or has limited access to one or more networks. For example, the user may be traveling to an area and the mobile device may be unable to communicate via base stations in the area without the user incurring additional costs. However, the user may have access to a public computer that has an Internet connection. The mobile device may generate a payload that includes a user identification associated with a mobile application and information indicating the request for the server. For example, the user identification may correspond to an eBook account (or a variety of other types of accounts) and the information for the request may indicate an eBook (or a variety of other types of files or information) that the user wants to download onto the mobile device. The mobile device may encrypt the payload (e.g., using a public key associated with the server or another suitable encryption key) and may sign the payload (e.g., using a private key associated with the mobile application or another suitable encryption key). For example, encrypting the information requesting an eBook download may prevent the public computer from being able to read user credentials or any other information corresponding to the request.

The mobile device may generate a first encoding that includes the encrypted payload and/or a uniform resource locator (URL) that indicates the location to send the encrypted payload. For example, the mobile device may generate a Quick Response (QR) code that contains the encrypted payload. The mobile device may display the first QR code on a display of the mobile device so that the untrusted computing device may scan it and obtain the encrypted payload and/or URL. The untrusted computing device may send the encrypted payload to the server (e.g., at the location indicated by the URL), for example, via a network connection of the untrusted computing device.

The server may receive the encrypted payload from the untrusted computing device and may decrypt it using one or more keys. The server may perform any requests indicated by the payload. For example, the server may retrieve the eBook that the mobile device requested. The server may encrypt the eBook and send it to the untrusted computing device. The untrusted computing device may generate one or more encodings of the eBook and may output them to the mobile device. For example, the untrusted computing device may generate a plurality of QR codes that encode the encrypted eBook and the mobile device may scan each of them. The mobile device may receive one or more encodings from the untrusted computing device and may update application information stored by the mobile application. For example, the mobile device may scan each QR code, assemble the scanned information based on an order indicated by the QR codes, and decrypt the eBook. The mobile device may store it in a library of a mobile eBook application.

Various other aspects, features, and advantages of the disclosure will be apparent through the detailed description of the disclosure and the drawings attached hereto. It is also to be understood that both the foregoing general description and the following detailed description are examples and not restrictive of the scope of the disclosure. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification "a portion," refers to a part of, or the entirety of (i.e., the entire portion), a given item (e.g., data) unless the context clearly dictates otherwise.

BRIEF DESCRIPTION OF THE DRAWINGS

FIG. 2 shows a table with example payloads that may be sent between a user device and a server, in accordance with some embodiments.

DETAILED DESCRIPTION

In the following description, for the purposes of explanation, numerous specific details are set forth in order to provide a thorough understanding of the disclosure. It will be appreciated, however, by those having skill in the art, that the disclosure may be practiced without these specific details or with an equivalent arrangement. In other cases, well-known structures and devices are shown in block diagram form to avoid unnecessarily obscuring the disclosure.

Figure 1:
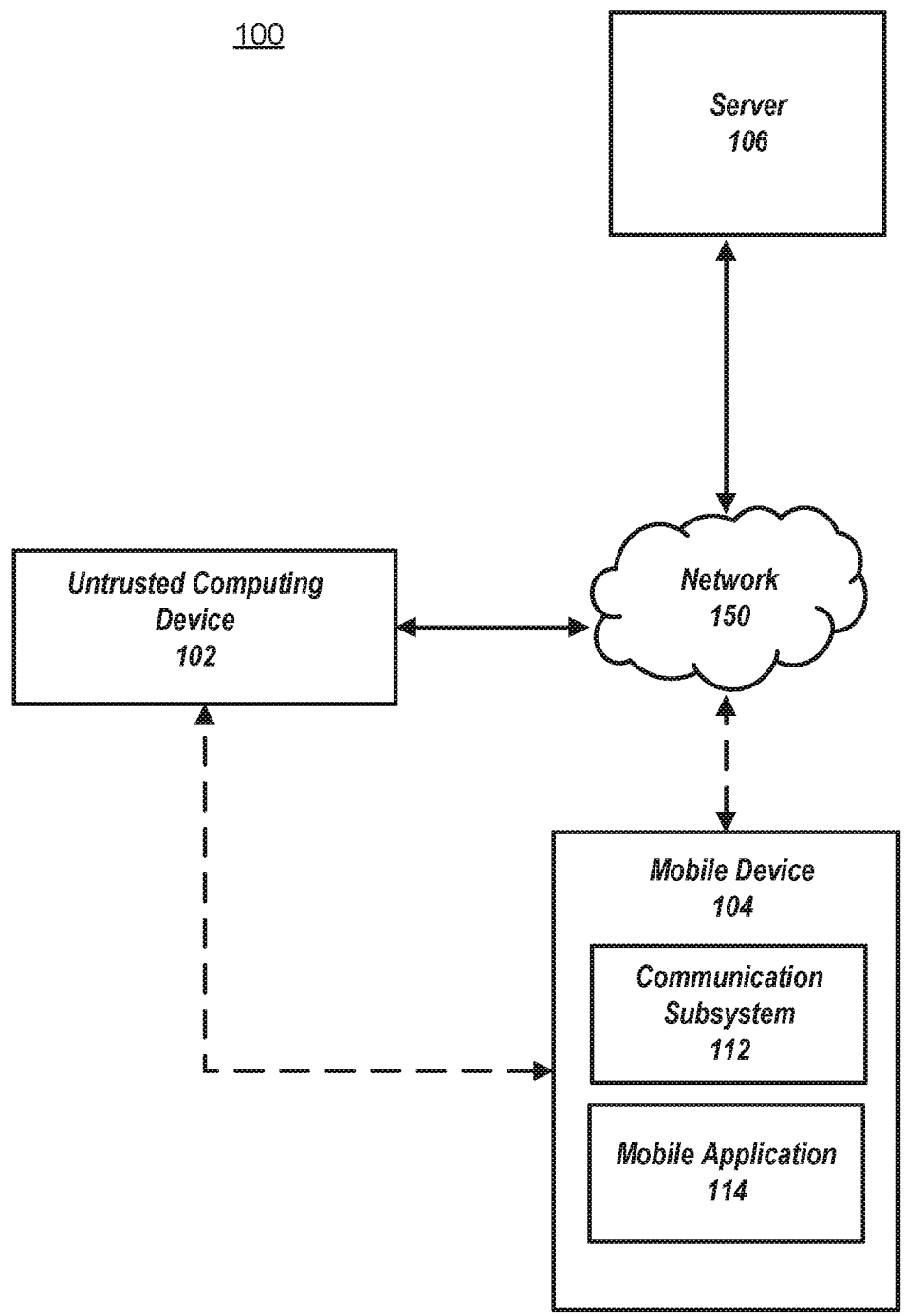
FIG. 1 shows an example computing system for secure communication between a user device and a server, in accordance with some embodiments.

FIG. 1 shows an example computing system 100 for secure communication between a server and a user device, for example, even if the user device does not have an Internet connection. A user device may communicate with an untrusted computing device to cause the untrusted computing device to send information (e.g., encrypted information that the untrusted computing device is unable to decrypt) to a server using an Internet connection of the untrusted computing device. The user device may have limited or no access to the Internet. To prevent potential security risks associated with using a public or untrusted computing device, the user device may encrypt information stored on the user device (e.g., stored in a mobile application associated with the server), send it to the untrusted computing device (e.g., by displaying a QR code to a camera of the untrusted computing device), and the untrusted computing device may send the information to the server via a network connection of the untrusted computing device.

A user device may receive (e.g., via an application on the user device) user input indicating a request for a server. For example, the user device may receive input on a mobile application indicating that the user would like to download a file from a server. The user may input the information on the user device because the user wishes to avoid having to enter any credentials on a public or other untrusted computing device. The user device may determine that the user device does not have access to the Internet or has limited access to one or more networks. For example, the user may be traveling to an area and the user device may be unable to communicate via base stations in the area without the user incurring additional costs. However, the user may have access to a public computer that has an Internet connection. The user device may generate a payload that includes a user identification associated with a mobile application and information indicating the request for the server. For example, the user identification may correspond to an account and the information for the request may indicate a file that the user wants to download onto the user device. The user device may encrypt the payload using a public key associated with the server and may sign the payload using a private key associated with the mobile application. For example, encrypting the information requesting a file download may prevent the public computer from being able to read user credentials or any other information corresponding to the request.

The user device may generate a first encoding that includes the encrypted payload and/or a uniform resource locator (URL) that indicates the location to send the encrypted payload. For example, the user device may generate a Quick Response (QR) code that contains the encrypted payload. The user device may display the first QR code on a display of the user device so that the untrusted computing device may scan it and obtain the encrypted payload and/or URL. The untrusted computing device may send the encrypted payload to the server (e.g., at the location indicated by the URL), for example, via a network connection of the untrusted computing device.

The server may receive the encrypted payload from the untrusted computing device and may decrypt it using one or more keys. The server may perform any requests indicated by the payload. For example, the server may retrieve the file that the user device requested. The server may encrypt the file and send it to the untrusted computing device. The untrusted computing device may generate one or more encodings of the file and may output them to the user device. For example, the untrusted computing device may generate a plurality of QR codes that encode the encrypted file, and the user device may scan each of them. The user device may receive one or more encodings from the untrusted computing device and may update application information stored by the mobile application. For example, the user device may scan each QR code, assemble the scanned information based on an order indicated by the QR codes, and decrypt the file. The user device may store it in a library of a mobile eBook application.

The computing system 100 may include an untrusted computing device 102, a mobile device 104, and/or a server 106. The solid line connecting the untrusted computing device 102 to the network 150 may indicate that the untrusted computing device 102 has a connection to the Internet (e.g., via network 150). The dotted line connecting the mobile device 104 to the network 150 indicates that the mobile device 104 may optionally have a connection to the Internet (e.g., via network 150). The dotted line connecting the mobile device 104 to the untrusted computing device 102 indicates that the mobile device 104 may optionally have a connection to the untrusted computing device 102 (e.g., peer to peer connection, a wireless or wired connection, etc.). The mobile device 104 may include a communication subsystem 112 and/or a mobile application 114. The mobile device 104 may receive user input indicating a request for a server. The user input may be received via the application 114 that is installed on the mobile device and associated with the server 106. For example, the application 114 may be a banking application that stores user credentials (e.g., account numbers, authentication tokens, etc.) of the user of the mobile device 104. The input may indicate any type of request, for example, requesting information from the server 106 or requesting the server 106 to perform an action. For example, the user's input may indicate a request to unlock a card (e.g., credit card) of the user, update information (e.g., account balance, or any other banking information), transfer money from one account to another account or any other request.

The mobile device 104 may determine that the mobile device 104 does not have access to the Internet. The mobile device 104 may not have access to the Internet, for example, because the mobile device 104 may be unable to connect to a network. For example, the user may be travelling and the mobile device 104 may not be able to connect to one or more networks without payment of additional fees. The mobile device 104 may not have access to the Internet, for example, because of restrictions imposed on the mobile device 104. For example, the mobile device 104 may be restricted to sending/receiving an amount of data for a given time period (e.g., 2 Gigabytes per month, etc.). The mobile device 104 may have exceeded a limit on the data it is permitted to receive and/or send ant thus may be unable to connect to the Internet.

The mobile device 104 may (e.g., in response to determining that the mobile device 104 does not have access to the Internet) generate a payload that includes a user identification and/or information indicating the request for the server 106. The user identification may be associated with the mobile application (e.g., an account number of the user logged into the mobile application). The payload may include any information the server 106 may need to perform the request. For example, the payload may include user credentials (e.g., authentication tokens, etc.), account information (e.g., for making a transfer of money between accounts) or any other information.

The mobile device 104 may encrypt the payload using one or more keys. Additionally or alternatively, the mobile device 104 may sign the payload using one or more keys. Encrypting and/or signing the payload may prevent any untrusted computing device (e.g., any device other than the server 106) from reading the information in the payload. Signing the payload may allow the server 106 to verify that the payload is from the mobile device 104. For example, the mobile device 104 may use a public key associated with the server 106 to encrypt the payload. The mobile device 104 may sign the payload using a private key associated with the mobile application. The server 106 may use a public key associated with the user device to verify that the payload is from the mobile device 104 and may use a private key of the server 106 to decrypt the payload. In some embodiments, the mobile device may use a different encryption method. For example, the mobile device may use a shared key or another suitable encryption method.

The user device may generate a first encoding that includes the encrypted payload and/or includes a uniform resource locator (URL). The URL may indicate a location for the encrypted payload to be sent. The first encoding may include a Quick Response (QR) code. Alternatively, the first encoding may be an audio encoding that may be output via one or more speakers of the mobile device 104. The mobile device 104 may output the audio encoding at a frequency that is inaudible to one or more humans. For example, many humans may be unable to hear audio that is output at a frequency greater than 20 kilohertz. The mobile device 104 may output the audio encoding at a frequency that is greater than 20 kilohertz (e.g., 20.5 kilohertz, 21 kilohertz, 35 kilohertz, or other frequencies). In some embodiments, the mobile device may use an audio encoding in response to determining that the size (e.g., in kilobytes, megabytes) of the payload and the URL cannot be stored in a visual encoding (e.g., a QR code or other encoding that may be displayed).

In some embodiments, the encrypted payload and/or URL may be too large to fit into one encoding (e.g., into a single QR code). The mobile device 104 may generate a plurality of encodings, where each encoding in the plurality comprises a portion of the payload and/or URL. For example, if the mobile device 104 determines that the payload is greater than a threshold size (e.g., 3 kilobytes, 5 megabytes, etc.) a plurality of encodings may be generated. The plurality of encodings may each include an identification and/or a number indicating an order. The identifications/numbers may be used by the server 106 to order the encodings, for example, if the encodings arrive out of order due to transmission over the Internet or other network. Furthermore, each encoding in the plurality of encodings may include an identifier that identifies the plurality. The server may, when receiving multiple requests, use the identifier to determine which encoding series the particular encodings are associated with. In some embodiments, the identifier may be a mobile device identifier.

The mobile device 104 may display one or more encodings (e.g., the first encoding as described above) on a display of the mobile device for scanning by an untrusted computing device 102. The scanning of the QR code may cause the untrusted computing device 102 to send the encrypted payload to the server 106 (e.g., at the location indicated by the URL), using a network connection of the untrusted computing device 102. The untrusted computing device 102 may use a browser application on the untrusted computing device 102 to open a website associated with the server 106. The website may cause the untrusted computing device 102 to use a camera on the untrusted computing device 102 to scan or take a picture of an encoding displayed by the mobile device 104. Scanning or taking a picture of the code may cause the untrusted computing device 102 to store the encrypted payload in memory of the untrusted computing device and allow it to transmit the encrypted payload to the server 106.

In some embodiments, information associated with the request may be stored in multiple encodings (e.g., the plurality of encodings as described above). The mobile device 104 may display or otherwise output each encoding in a continuous cycle. For example, the mobile device 104 may display a plurality of QR codes in a repeating cycle. Each encoding of the multiple encodings may be displayed for a predetermined time (e.g., 1 second, half a second, etc.) before the next encoding of the multiple encodings is displayed or output. The mobile device 104 may output the encodings in a continuous cycle (e.g., a cycle that repeats) until the untrusted computing device 102 is able to receive each encoding. Each encoding may indicate the number of encodings that contain the payload and the untrusted computing device 102 may determine that the scanning is complete after it has received the correct number of encodings. The untrusted computing device 102 may output an indication that it has received each of the encodings (e.g., via near field communication, via a display of the untrusted computing device 102). The mobile device 104 may stop displaying the cycle of encodings, for example, based on receiving the indication that the untrusted computing device 102 has received each of the encodings. By cycling through the encodings, the user may have a better user experience because it may be easier to make sure each of the encodings is received by the untrusted computing device 102 if the cycle is repeated. In some embodiments, each of the plurality of encodings may include the URL and the portion of the payload associated with the particular encoding.

In some embodiments, the mobile device 104 may determine that no untrusted computing devices are within a threshold distance of the mobile device 104. For example, the mobile device 104 may determine that there is no available device to connect with (e.g., via Bluetooth, via peer to peer, 5G New Radio, via a Near Field Communication Protocol (NFC), or any other wireless communication protocol). The mobile device 104 may display a notification indicating that there are no computing devices within the threshold distance. For example, the user may be traveling in an area and may enter a request to unlock a credit card on the mobile device 104. The user device may determine that there are no nearby computing devices that may be used to send the request. The mobile device 104 may store the request and continue to check whether devices (e.g., devices with Internet connections) are nearby, for example, as the user continues traveling. The mobile device 104 may determine, via a received wireless communication (e.g., a radio signal), that an untrusted computing device is now within a threshold distance (e.g., 100 meters, 10 meters, etc.) of the mobile device 104. In response to determining that the untrusted computing device is within a threshold distance of the mobile device 104, the mobile device 104 may output a notification indicating that the untrusted computing device is within the threshold distance and may generate one or more encodings of the payload. The untrusted computing device 102 may take pictures of the encodings or scan the encodings to enable it to send the encrypted payload to the server 106.

The server 106 may receive the payload from the untrusted computing device 102 and may decrypt the payload. The server 106 may perform the request indicated in the payload. The server 106 may send information associated with the request to the untrusted computing device 102, for example, in response to receiving the payload. For example, if the request indicates that the user would like to receive updated information corresponding to an account of the user (e.g., transaction history, account balance, etc.), the server 106 may send the information to the untrusted computing device 102 via a second encrypted payload. The server 106 may encrypt the information prior to sending it to the untrusted computing device 102 to prevent the untrusted computing device 102 from reading the information. For example, the information (e.g., a second payload) may be encrypted with a public key associated with the mobile application and signed using a private key of the server. The untrusted computing device 102 may generate one or more encodings of the information and may output the encodings to the mobile device 104. For example, the untrusted computing device 102 may display one or more encodings (e.g., one or more QR codes) on a display associated with the untrusted computing device 102. The mobile device 104 may scan the one or more encodings displayed on the untrusted computing device 102 and decrypt them (e.g., using a private or public key associated with the mobile application or server 106). The mobile device 104 may update application information stored in the mobile application, for example, based on the information received from the server 106.

In some embodiments, the mobile device 104 may determine, based on an identifier associated with the request, that the information received from the server 106 (e.g., a second payload) is responsive to the request. For example, the first payload sent from the mobile device 104 to the untrusted computing device 102 may include an identifier. The server 106 may include the identifier in the response information that the server 106 sends to the untrusted computing device 102. The untrusted computing device 102 may include the identifier in the encoding that is received by the mobile device 104.

The mobile device 104, the server 106, and/or the untrusted computing device 102 may determine what type of encoding to generate. For example, the encoding may be an audio encoding, a visual encoding (e.g., a QR code), an encoding that may be transmitted via radio frequency, or any other type of encoding. A device (e.g., the mobile device 104, the server 106, and/or the untrusted computing device 102) may determine which type of encoding to use, for example, based on a size of the payload/information to be encoded. The device may determine that a size of the encrypted payload/information exceeds the maximum size. For example, the device may determine that the payload will not fit in one QR code. Based on determining that a size of the encrypted payload exceeds the maximum size for one type of encoding, the device may determine a different type of encoding to use. For example, based on determining that a size of the encrypted payload exceeds the maximum size for a QR code, the device may determine to generate an audio encoding of the encrypted payload. The device may output the audio encoding via a speaker of the device. The audio encoding may be received (e.g., at the untrusted computing device 102 or the mobile device 104) via a microphone.

Referring to FIG. 2, a table 200 with example requests and encodings is shown. As shown in row 201, the mobile device 104 may determine that the size of a payload for action 1 is less than a threshold for using a visual encoding. The mobile device 104 may communicate with the untrusted computing device 102 (e.g., via wireless communication such as Bluetooth or near field communication) and determine that the untrusted computing device 102 has a camera.

Alternatively, the mobile device 104 may receive input from the user indicating that the untrusted computing device 102 has a camera. The mobile device 104 may determine to use a visual type encoding with a single encoding, for example, based on a determination that the untrusted computing device 102 has a camera and/or based on the size of the payload being less than the threshold size.

According to row 202, the user device may determine to use a visual type encoding with multiple encodings, for example, based on determining that the untrusted computing device has a camera and/or based on the size of the payload being greater than the threshold size. For example, the mobile device 104 may determine that the payload is too large to fit into one QR code and may determine to generate multiple QR codes (e.g., as described above in connection with FIG. 1).

According to row 203, the mobile device 104 may determine to use an audio encoding (e.g., a single audio stream encoding), for example, based on determining that the payload is greater than a threshold size (e.g., greater than the amount of data that can be stored in 10 QR codes, greater than the amount of data that can be stored in 1 QR code, etc.) and/or based on determining that the untrusted computing device has a microphone. For example, the mobile device 104 may communicate with the untrusted computing device 102 (e.g., via wireless communication protocol such as Bluetooth or NFC) and determine that the untrusted computing device 102 has a microphone and/or does not have a camera. Alternatively, the mobile device 104 may receive input from the user indicating that the untrusted computing device 102 has a microphone and/or does not have a camera. Additionally or alternatively, the mobile device 104 may receive input indicating whether the audio encoding should be output at a frequency that may be inaudible to other users (e.g., greater than 20 kilohertz). The mobile device 104 may output, based on the user input, the audio at a frequency that is inaudible to other users.

Figure 3:
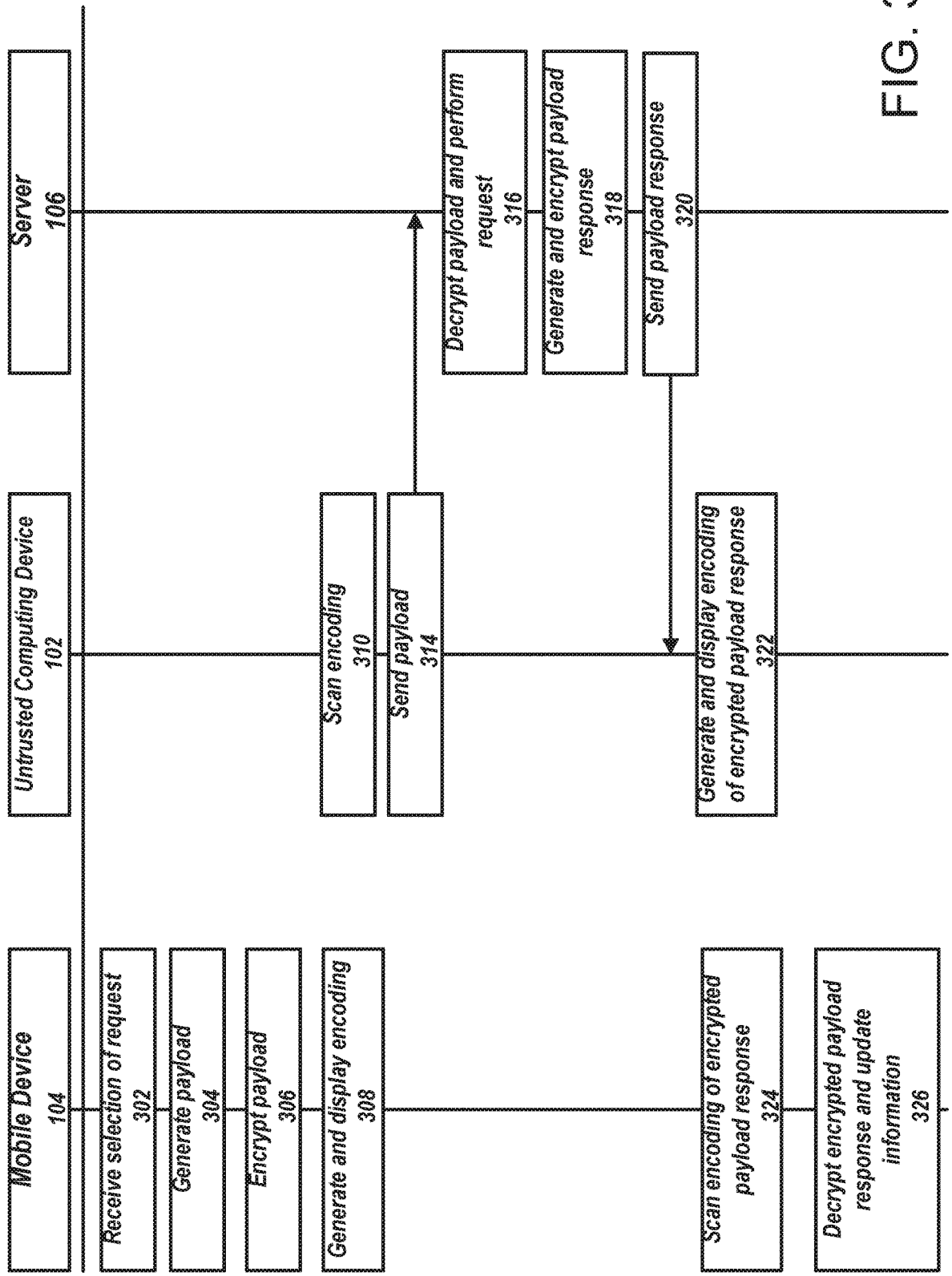
FIG. 3 shows an example flow chart of the action involved in authenticating a user by using an encrypted access code, in accordance with some embodiments.

FIG. 3 shows an example flow diagram for secure communication between a user device and a server. At 302, the mobile device 104 may receive a selection of a request from a user. For example, the request may indicate that a file should be sent to the server 106. At 304, the mobile device 104 may generate a payload that includes the file. At 306, the mobile device 104 may encrypt the payload. For example, the payload may be encrypted using a key associated with the server 106 (e.g., a key that is shared between the mobile device 104 and the server 106). At 308, the mobile device 104 may generate an encoding of the encrypted payload and display it (e.g., on a screen of the mobile device 104).

At 310 the untrusted computing device 102 may scan the encoding displayed on the mobile device 104. Scanning the encoding may allow the untrusted computing device 102 to store the payload in temporary memory. At 314, the untrusted computing device 102 may send the payload to the server 106, for example, via an Internet connection of the untrusted computing device 102.

At 316, the server 106 may decrypt the payload and/or perform the request. For example, the server 106 may store the file that the user requested to be sent to the server 106. At 318, the server 106 may generate an encrypt a payload response. For example, the response may indicate that the file was received by the server 106. At 320, the server 106 may send (e.g., via the Internet) the payload response to the untrusted computing device 102. At 322, the untrusted computing device 102 may generate an encoding of the encrypted payload response and may display it so that it may be received by the mobile device 104.

At 324, the mobile device 104 may scan the encoding of the encrypted payload response that is displayed by the untrusted computing device. At 326, the mobile device 104 may decrypt the payload response and may update information. For example, the mobile device 104 may update a log to indicate that the file was successfully transferred to the server 106.

Referring to FIG. 1, the mobile device 104 may be any computing device, including, but not limited to, a laptop computer, a tablet computer, a hand-held computer, smartphone, other computer equipment (e.g., a server or virtual server), including "smart," wireless, wearable, Internet of Things device, and/or mobile device. Although only one mobile device 104 is shown, the system 100 may include any number of client devices.

The server 106 may include one or more computing devices described above and/or may include any type of mobile terminal, fixed terminal, or other device. For example, the server 106 may be implemented as a cloud computing system and may feature one or more component devices. A person skilled in the art would understand that system 100 is not limited to the devices shown in FIG. 1. Users may, for example, utilize one or more other devices to interact with devices, one or more servers, or other components of system 100. A person skilled in the art would also understand that while one or more operations are described herein as being performed by particular components of the system 100, those operations may, in some embodiments, be performed by other components of the system 100. As an example, while one or more operations are described herein as being performed by components of the server 106, those operations may be performed by components of the mobile device 104, and/or server 106. In some embodiments, the various computers and systems described herein may include one or more computing devices that are programmed to perform the described functions. Additionally or alternatively, multiple users may interact with system 100 and/or one or more components of system 100. For example, a first user and a second user may interact with the server 106 using two different client devices.

One or more components of the untrusted computing device 102, mobile device 104, and/or server 106, may receive content and/or data via input/output (hereinafter "I/O") paths. The one or more components of the untrusted computing device 102, the mobile device 104, and/or the server 106 may include processors and/or control circuitry to send and receive commands, requests, and other suitable data using the I/O paths. The control circuitry may include any suitable processing, storage, and/or input/output circuitry. Each of these devices may include a user input interface and/or user output interface (e.g., a display) for use in receiving and displaying data. It should be noted that in some embodiments, the untrusted computing device 102, the mobile device 104, and/or the server 106 may have neither user input interface nor displays and may instead receive and display content using another device (e.g., a dedicated display device such as a computer screen and/or a dedicated input device such as a remote control, mouse, voice input, etc.). Additionally, the devices in system 100 may run an application (or another suitable program). The application may cause the processors and/or control circuitry to perform operations related to weighting training data (e.g., to increase the efficiency of training and/or performance of one or more machine learning models).

One or more components and/or devices in the system 100 may include electronic storages. The electronic storages may include non-transitory storage media that electronically stores information. The electronic storage media of the electronic storages may include one or both of (a) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 1 also includes a network 150. The network 150 may be the Internet, a mobile phone network, a mobile voice or data network (e.g., a 5G or LTE network), a cable network, a public switched telephone network, a combination of these networks, or other types of communications networks or combinations of communications networks. The devices in FIG. 1 (e.g., untrusted computing device 102, the mobile device 104, and/or the server 106) may communicate (e.g., with each other or other computing systems not shown in FIG. 1) via the network 150 using one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The devices in FIG. 1 may include additional communication paths linking hardware, software, and/or firmware components operating together. For example, the untrusted computing device 102, the mobile device 104, and/or the server 106 may be implemented by one or more computing platforms.

Figure 4:
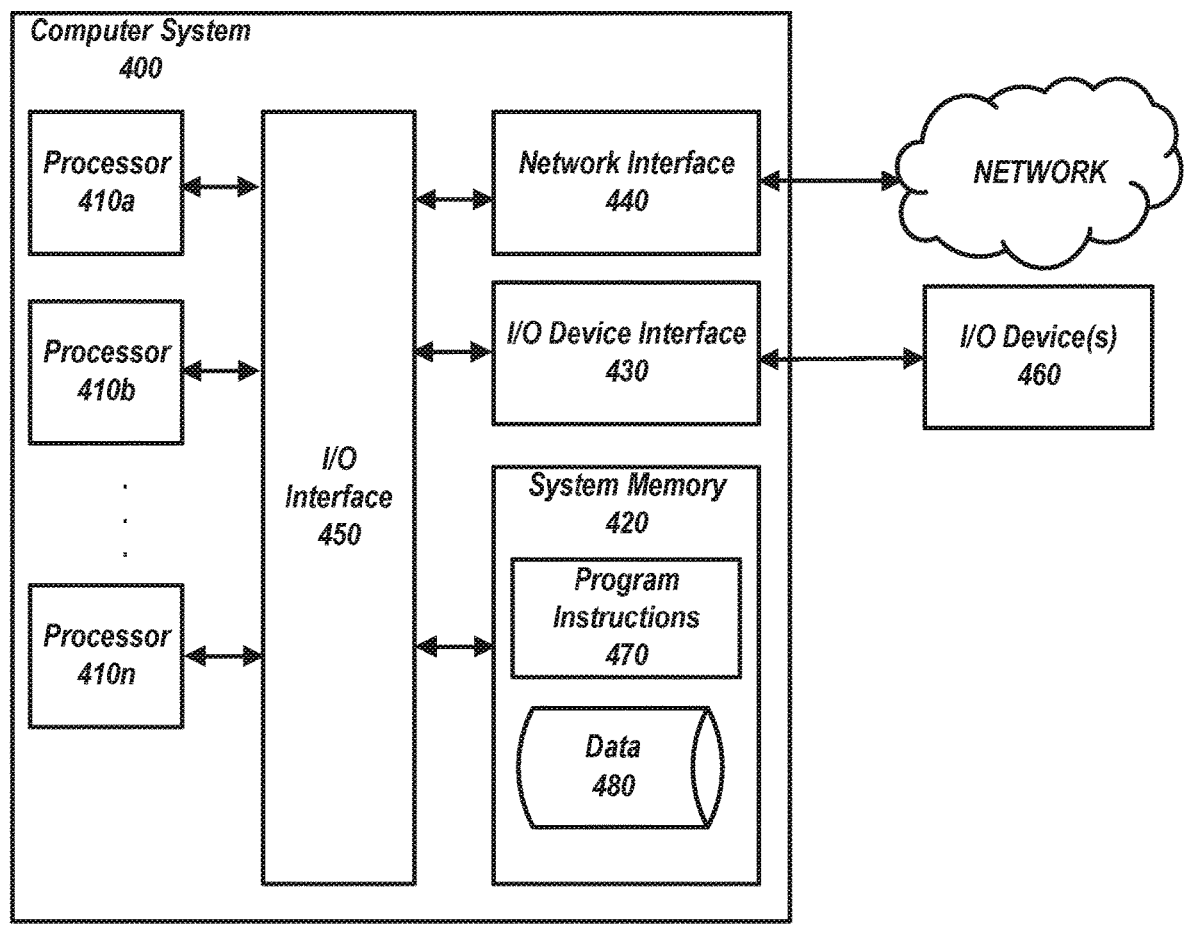
FIG. 4 shows an example computing system that may be used in accordance with some embodiments.

FIG. 4 is a diagram that illustrates an exemplary computing system 400 in accordance with embodiments of the present technique. Various portions of systems and methods described herein, may include or be executed on one or more computer systems similar to computing system 400. Further, processes and modules described herein may be executed by one or more processing systems similar to that of computing system 400.

Computing system 400 may include one or more processors (e.g., processors 410a-410n) coupled to system memory 420, an input/output I/O device interface 430, and a network interface 440 via an input/output (I/O) interface 450. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 400. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 420). Computing system 400 may be a units-processor system including one processor (e.g., processor 410a), or a multi-processor system including any number of suitable processors (e.g., 410a-410n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 400 may include a plurality of computing devices (e.g., distributed computer systems) to implement various processing functions.

I/O device interface 430 may provide an interface for connection of one or more I/O devices 460 to computing system 400. I/O devices may include devices that receive input (e.g., from a user) or output information (e.g., to a user). I/O devices 460 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 460 may be connected to computing system 400 through a wired or wireless connection. I/O devices 460 may be connected to computing system 400 from a remote location. I/O devices 460 located on remote computer system, for example, may be connected to computing system 400 via a network and network interface 440.

Network interface 440 may include a network adapter that provides for connection of computing system 400 to a network. Network interface may 440 may facilitate data exchange between computing system 400 and other devices connected to the network. Network interface 440 may support wired or wireless communication. The network may include an electronic communication network, such as the Internet, a local area network (LAN), a wide area network (WAN), a cellular communications network, or the like.

System memory 420 may be configured to store program instructions 470 or data 480. Program instructions 470 may be executable by a processor (e.g., one or more of processors 410a-410n) to implement one or more embodiments of the present techniques. Instructions 470 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 420 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 420 may include a non-transitory computer readable storage medium that may have program instructions stored thereon that are executable by a computer processor (e.g., one or more of processors 410a-410n) to cause the subject matter and the functional operations described herein. A memory (e.g., system memory 420) may include a single memory device and/or a plurality of memory devices (e.g., distributed memory devices).

I/O interface 450 may be configured to coordinate I/O traffic between processors 410a-410n, system memory 420, network interface 440, I/O devices 460, and/or other peripheral devices. I/O interface 450 may perform protocol, timing, or other data transformations to convert data signals from one component (e.g., system memory 420) into a format suitable for use by another component (e.g., processors 410a-410n). I/O interface 450 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computing system 400 or multiple computer systems 400 configured to host different portions or instances of embodiments. Multiple computer systems 400 may provide for parallel or sequential processing/execution of one or more portions of the techniques described herein.

Those skilled in the art will appreciate that computing system 400 is merely illustrative and is not intended to limit the scope of the techniques described herein. Computing system 400 may include any combination of devices or software that may perform or otherwise provide for the performance of the techniques described herein. For example, computing system 400 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computing system 400 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computing system 400 may be transmitted to computing system 400 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present disclosure may be practiced with other computer system configurations.

Figure 5:
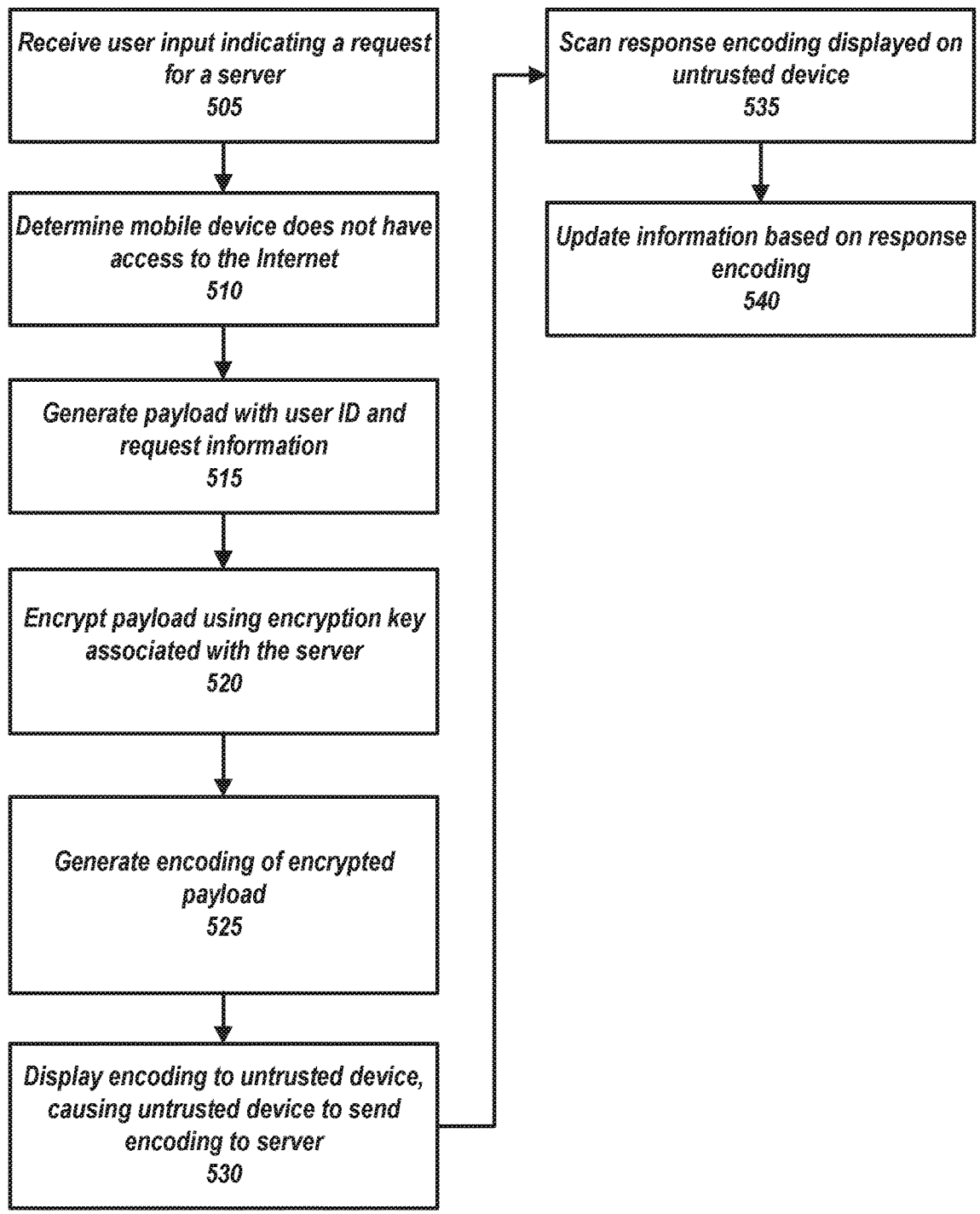
FIG. 5 shows an example flowchart of the actions involved in secure communication between a user device and a server, in accordance with some embodiments.

FIG. 5 shows an example flowchart of the actions involved in authenticating, without the use of an Internet connection of a mobile device, with a server and causing the server to respond to a request. For example, process 500 may represent the actions taken by one or more devices shown in FIGS. 1-4 and described above. At 505, mobile device 104 (e.g., using one or more components in system 100 (FIG. 1) and/or computing system 400 via I/O interface 450 and/or processors 410a-410n (FIG. 4)) receives user input indicating a request for the server 106. The input may indicate an action for the server 106 to perform.

At 510, mobile device 104 (e.g., using one or more components in system 100 (FIG. 1) and/or computing system 400 via one or more processors 410a-410n, I/O interface 450, and/or system memory 420 (FIG. 4)) determines that the mobile device 104 or the computing system 400 does not have access to the Internet. For example, there may be no access to the Internet at the location of the mobile device 104. As an additional example, the mobile device 104 may have exceeded or reached a data usage limit for a particular time period.

At 515, mobile device 104 (e.g., using one or more components in system 100 (FIG. 1) and/or computing system 400 via one or more processors 410a-410n and system memory 420 (FIG. 4)) generates a payload. The payload may include a user identification of a user associated with the mobile device 104. The user identification may be an account number (e.g., a credit card number, a debit card number, or other bank account number). The payload may include a request for the server. For example, the request may indicate that a credit card associated with the user identification should be unlocked or that money should be transferred from one account to another account. The payload may be generated for example, based on determining that the mobile device 104 does not have access to the Internet.

At 520, mobile device 104 (e.g., using one or more components in system 100 (FIG. 1) and/or computing system 400 via one or more processors 410a-410n (FIG. 4)) encrypts the payload using an encryption key associated with the server. For example, the encryption key may be a public key associated with a private key of the server 106.

At 525, mobile device 104 (e.g., using one or more components in system 100 (FIG. 1) and/or computing system 400 (FIG. 4)) generates an encoding of the encrypted payload. For example, the mobile device 104 may generate a quick response (QR) code that comprises the encrypted payload and/or the user identification. The encoding may be an audio encoding that may be output from a speaker of the mobile device 104.

At 530, mobile device 104 (e.g., using one or more components in system 100 (FIG. 1) and/or computing system 400 via the network interface 440 (FIG. 4)) displays the encoding to an untrusted computing device. The untrusted computing device may scan the encoding and send the encrypted payload to the server 106 using an Internet connection of the untrusted computing device. In some embodiments, the mobile device 104 may output audio via a speaker of the mobile device 104, for example, if the encoding is an audio encoding. The untrusted computing device may receive the audio (e.g., the audio containing the payload) via a microphone, decode it, and send it to the server 106.

At 535, mobile device 104 (e.g., using one or more components in system 100 (FIG. 1) and/or computing system 400 via one or more processors 410a-410n (FIG. 4)) scans a response encoding displayed on the untrusted computing device 102. For example, the server 106 may perform the request and may send encrypted response information to the untrusted computing device 102. The untrusted computing device may generate an encoding of the encrypted response information and display or otherwise output it. For example, the untrusted computing device 102 may generate a QR code comprising the response information and display it on a screen of the untrusted computing device 102 so that the mobile device 104 may scan and thus receive the encrypted response information. In some embodiments, the untrusted computing device 102 may encode the response information as audio and may output it via a speaker. The mobile device 104 may receive the audio encoding via a speaker of the mobile device 104.

At 540, mobile device 104 (e.g., using one or more components in system 100 (FIG. 1) and/or computing system 400 via one or more processors 410a-410n (FIG. 4)) updates information based on the response information. The mobile device 104 may have access to one or more keys (e.g., via a mobile application associated with the server 106) that may be used to decrypt the encrypted response information. The mobile device 104 may use the response information to update information stored on the mobile application.

It is contemplated that the actions or descriptions of FIG. 5 may be used with any other embodiment of this disclosure.

In addition, the actions and descriptions described in relation to FIG. 5 may be done in alternative orders or in parallel to further the purposes of this disclosure. For example, each of these actions may be performed in any order, in parallel, or simultaneously to reduce lag or increase the speed of the system or method. Furthermore, it should be noted that any of the devices or components discussed in relation to FIGS. 1-4 could be used to perform one or more of the actions in FIG. 5.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g., within a data center or geographically), or otherwise differently organized. The functionality described herein may be provided by one or more processors of one or more computers executing code stored on a tangible, non-transitory, machine readable medium. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several disclosures. Rather than separating those disclosures into multiple isolated patent applications, applicants have grouped these disclosures into a single document because their related subject matter lends itself to economies in the application process. But the distinct advantages and aspects of such disclosures should not be conflated. In some cases, embodiments address all of the deficiencies noted herein, but it should be understood that the disclosures are independently useful, and some embodiments address only a subset of such problems or offer other, unmentioned benefits that will be apparent to those of skill in the art reviewing the present disclosure. Due to costs constraints, some features disclosed herein may not be presently claimed and may be claimed in later filings, such as continuation applications or by amending the present claims. Similarly, due to space constraints, neither the Abstract nor the Summary sections of the present document should be taken as containing a comprehensive listing of all such disclosures or all aspects of such disclosures.

It should be understood that the description and the drawings are not intended to limit the disclosure to the particular form disclosed, but to the contrary, the intention is to cover all modifications, equivalents, and alternatives falling within the spirit and scope of the present disclosure as defined by the appended claims. Further modifications and alternative embodiments of various aspects of the disclosure will be apparent to those skilled in the art in view of this description. Accordingly, this description and the drawings are to be construed as illustrative only and are for the purpose of teaching those skilled in the art the general manner of carrying out the disclosure. It is to be understood that the forms of the disclosure shown and described herein are to be taken as examples of embodiments. Elements and materials may be substituted for those illustrated and described herein, parts and processes may be reversed or omitted, and certain features of the disclosure may be utilized independently, all as would be apparent to one skilled in the art after having the benefit of this description of the disclosure. Changes may be made in the elements described herein without departing from the spirit and scope of the disclosure as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing actions A, B, C, and D) encompasses both all such attributes or functions being mapped to all such objects and subsets of the attributes or functions being mapped to subsets of the attributes or functions (e.g., both all processors each performing actions A-D, and a case in which processor 1 performs action A, processor 2 performs action B and part of action C, and processor 3 performs part of action C and action D), unless otherwise indicated. Further, unless otherwise indicated, statements that one value or action is "based on" another condition or value encompass both instances in which the condition or value is the sole factor and instances in which the condition or value is one factor among a plurality of factors. The term "each" is not limited to "each and every" unless indicated otherwise. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method comprising: receiving, at a device, user input indicating a request; in response to determining that a network connection is not available via the mobile device, generating a payload comprising an account identification associated with a mobile application and information indicating the request for the server; generating a first encoding, wherein the first encoding comprises the encrypted payload; and outputting the first encoding to an untrusted computing device.

2. The method of any of the preceding embodiments, further comprising: receiving a second code outputted by the untrusted computing device, wherein the second code is generated by the server, and wherein the second code comprises a second payload encrypted with a public key associated with the mobile application and signed using a private key of the server; determining, based on an identifier associated with the request that the second payload is responsive to the request; and in response to determining that the second payload is responsive to the request, updating, based on information in the second payload, application information that is associated with the account identification.

3. The method of any of the preceding embodiments, further comprising: determining, that no untrusted computing devices are within a threshold distance of the mobile device; generating for display a first notification indicating that there are no computing devices within the threshold distance; determining, via a received radio signal, that the untrusted computing device is now within the threshold distance of the mobile device; and in response to determining that the untrusted computing device is within a threshold distance of the mobile device, outputting a notification indicating that the untrusted computing device is within a threshold distance to a user and generating the first encoding.

4. The method of any of the preceding embodiments, wherein outputting the first encoding to the untrusted computing device is performed in response to determining that the untrusted computing device is now within the threshold distance of the mobile device.

5. The method of any of the preceding embodiments, further comprising: determining that a size of the encrypted payload exceeds a threshold size; based on determining that the size of the encrypted payload exceeds the threshold size, generating a plurality of encodings, wherein each encoding of the plurality of encodings encodes a portion of the encrypted payload, and wherein each encoding comprises an identifier for ordering the plurality of encodings after transmission over a network; and outputting the plurality of encodings on a display of the mobile device.

6. The method of any of the preceding embodiments, further comprising: displaying each encoding of the plurality of encodings in a continuous cycle, wherein each encoding is displayed for a predetermined time before a next encoding of the plurality of encodings is displayed; and in response to receiving, via near field communication, a stop signal from the untrusted device, ceasing display of the plurality of encodings.

7. The method of any of the preceding embodiments, wherein outputting the first encoding to the untrusted computing device comprises: determining a maximum size of encrypted payload supported by an encoding protocol associated with the first encoding; determining that a size of the encrypted payload exceeds the maximum size; based on determining that a size of the encrypted payload exceeds the maximum size, generating an audio encoding of the encrypted payload; and outputting the audio encoding via a speaker of the mobile device, wherein the audio encoding is received via a microphone of the untrusted computing device.

8. The method of any of the preceding embodiments, wherein outputting the audio encoding comprises outputting the audio encoding at a frequency that is greater than 20 kilohertz.

9. A tangible, non-transitory, machine-readable medium storing instructions that, when executed by a data processing apparatus, cause the data processing apparatus to perform operations comprising those of any of embodiments 1-8.

10. A system comprising: one or more processors; and memory storing instructions that, when executed by the processors, cause the processors to effectuate operations comprising those of any of embodiments 1-8.

11. A system comprising means for performing any of embodiments 1-8.

What is claimed is:

1. A method comprising:
receiving, at a mobile device, user input indicating a request for a server system;
generating, based on a lack of Internet access of the mobile device, an encrypted payload comprising an account identification associated with a mobile application and information indicating the request for the server system;
determining that a size of the encrypted payload exceeds a maximum size supported by an encoding protocol for a given encoding type;
generating a first encoding as an audio encoding of the encrypted payload based on the determination that the size of the encrypted payload exceeds the maximum size, the audio encoding being of a different encoding type than the given encoding type, wherein the audio encoding comprises the encrypted payload and a uniform resource locator (URL) indicating a location to send the encrypted payload; and
outputting the first encoding to an untrusted computing device, wherein the outputting of the first encoding causes the untrusted computing device to send the encrypted payload to the server system using a network connection of the untrusted computing device,
wherein outputting the first encoding to the untrusted computing device comprises outputting the audio encoding via a speaker of the mobile device, the audio encoding being received via a microphone of the untrusted computing device.

2. The method of claim 1, further comprising:
receiving a second encoding outputted by the untrusted computing device, wherein the second encoding is generated by the server system, and wherein the second encoding comprises an encrypted content portion of a content file;
determining, based on an identifier associated with the request, that the second encoding is responsive to the request; and
in response to determining that the second encoding is responsive to the request, updating, based on the encrypted content portion in the second encoding, application information that is associated with the account identification.

3. The method of claim 1, further comprising:
determining that no untrusted computing devices are within a threshold distance of the mobile device;

generating for display a first notification indicating that there are no computing devices within the threshold distance;

determining, via a received radio signal, that the untrusted computing device is now within the threshold distance of the mobile device; and in response to determining that the untrusted computing device is within the threshold distance of the mobile device, outputting a notification indicating that the untrusted computing device is within the threshold distance and generating the first encoding.

4. The method of claim 3, wherein outputting the first encoding to the untrusted computing device is performed in response to determining that the untrusted computing device is now within the threshold distance of the mobile device.

5. The method of claim 1, further comprising:

in connection with receiving the user input indicating the request, outputting, by the mobile device, the first encoding and at least one other encoding to the untrusted computing device, wherein both the first encoding and the at least one other encoding comprise the URL, wherein the outputting of the first encoding and the at least one other encoding causes the untrusted computing device to send the encrypted payload of the first encoding and other information of the at least one other encoding to the server system using the URL and the network connection of the untrusted computing device.

6. The method of claim 1, further comprising:

receiving a second encoding and one or more other encodings outputted by the untrusted computing device, wherein the second encoding and the one or more other encodings are generated by the server system, wherein the second encoding comprises an encrypted content portion of a content file, wherein the one or more other encodings comprise one or more other encrypted content portions of the content file; and updating, based on the encrypted content portion in the second encoding and the one or more other encrypted content portions in the one or more other encodings, application information that is associated with the account identification.

7. The method of claim 1, wherein outputting the audio encoding comprises outputting the audio encoding at a frequency that is greater than 20 kilohertz.

8. The method of claim 1, wherein determining that the size of the encrypted payload exceeds the maximum size comprises determining that the size of the encrypted payload exceeds a first maximum size supported by a first graphical encoding protocol, and wherein generating the first encoding comprises generating the audio encoding based on the determination that the size of the encrypted payload exceeds the first maximum size supported by the first graphical encoding protocol.

9. A mobile device comprising:

one or more processors and computer program instructions that, when executed, cause the mobile device to perform operations comprising:

receiving user input indicating a request for a server system;

generating, based on a lack of Internet access of the mobile device, an encrypted payload comprising an account identification associated with a mobile application and information indicating the request for the server system;

determining that a size of the encrypted payload exceeds a threshold size supported by an encoding protocol for a given encoding type;

generating a first audio encoding, in lieu of an encoding of the given encoding type, based on the determination that the size of the encrypted payload exceeds the threshold size, wherein the first audio encoding comprises the encrypted payload and a reference to the server system to send the encrypted payload; and outputting the first audio encoding to an untrusted computing device, wherein the outputting of the first audio encoding causes the untrusted computing device to send the encrypted payload to the server system using a network connection of the untrusted computing device.

10. The mobile device of claim 9, wherein generating the first audio encoding comprises generating the first audio encoding, in lieu of a graphical encoding corresponding to the given encoding type, based on the determination that the size of the encrypted payload exceeds the threshold size.

11. The mobile device of claim 9, the operations further comprising:

receiving a second encoding outputted by the untrusted computing device, wherein the second encoding is generated by the server system, and wherein the second encoding comprises an encrypted content portion of a content file and an identifier of the request; and based on (i) the encrypted content portion in the second encoding and (ii) a determination that the identifier of the request is in the second encoding, updating application information that is associated with the account identification.

12. The mobile device of claim 9, the operations further comprising:

determining that no untrusted computing devices are within a threshold distance of the mobile device;

generating for display a first notification indicating that there are no computing devices within the threshold distance;

determining, via a received radio signal, that the untrusted computing device is now within the threshold distance of the mobile device; and in response to determining that the untrusted computing device is within the threshold distance of the mobile device, outputting a notification indicating that the untrusted computing device is within the threshold distance and generating the first audio encoding, wherein outputting the first audio encoding to the untrusted computing device is performed in response to determining that the untrusted computing device is now within the threshold distance of the mobile device.

13. The mobile device of claim 9, the operations further comprising:

in connection with receiving the user input indicating the request, outputting, by the mobile device, the first audio encoding and at least one other encoding to the untrusted computing device, wherein both the first audio encoding and the at least one other encoding comprise the reference, wherein the outputting of the first audio encoding and the at least one other encoding causes the untrusted computing device to send the encrypted payload of the first audio encoding and other information of the at least one other encoding to the server system using the reference and the network connection of the untrusted computing device.

14. The mobile device of claim 9, the operations further comprising:
- receiving a second encoding and one or more other encodings outputted by the untrusted computing device, wherein the second encoding and the one or more other encodings are generated by the server system, wherein the second encoding comprises an encrypted content portion of a content file, wherein the one or more other encodings comprise one or more other encrypted content portions of the content file; and
- updating, based on the encrypted content portion in the second encoding and the one or more other encrypted content portions in the one or more other encodings, application information that is associated with the account identification.

15. One or more non-transitory machine-readable media storing instructions that, when executed by one or more processors, effectuate operations comprising:
- receiving user input indicating a request for a server system;
- generating, based on a lack of Internet access of a mobile device, an encrypted payload comprising an account identification associated with a mobile application and information indicating the request for the server system;
- determining that a size of the encrypted payload exceeds a threshold size supported by an encoding protocol for a given encoding type;
- generating a first audio encoding, in lieu of an encoding of the given encoding type, based on the determination that the size of the encrypted payload exceeds the threshold size, wherein the first audio encoding comprises the encrypted payload and a reference indicating a location to send the encrypted payload; and
- outputting the first audio encoding to an untrusted computing device, wherein the outputting of the first audio encoding causes the untrusted computing device to send the encrypted payload to the server system using a network connection of the untrusted computing device.

16. The one or more non-transitory machine-readable media of claim 15, wherein generating the first audio encoding comprises generating the first audio encoding, in lieu of a graphical encoding corresponding to the given encoding type, based on the determination that the size of the encrypted payload exceeds the threshold size.

17. The one or more non-transitory machine-readable media of claim 15, the operations further comprising:
- receiving a second encoding outputted by the untrusted computing device, wherein the second encoding is generated by the server system, and wherein the second encoding comprises an encrypted content portion of a content file and an identifier of the request; and
- based on (i) the encrypted content portion in the second encoding and (ii) a determination that the identifier of the request is in the second encoding, updating application information that is associated with the account identification.

18. The one or more non-transitory machine-readable media of claim 15, the operations further comprising:
- determining that no untrusted computing devices are within a threshold distance of the mobile device;
- generating for display a first notification indicating that there are no computing devices within the threshold distance;
- determining, via a received radio signal, that the untrusted computing device is now within the threshold distance of the mobile device; and
- in response to determining that the untrusted computing device is within the threshold distance of the mobile device, outputting a notification indicating that the untrusted computing device is within the threshold distance and generating the first audio encoding.

19. The one or more non-transitory machine-readable media of claim 18, wherein outputting the first audio encoding to the untrusted computing device is performed in response to determining that the untrusted computing device is now within the threshold distance of the mobile device.

20. The one or more non-transitory machine-readable media of claim 15, wherein the reference of the first audio encoding comprises a uniform resource locator (URL) indicating the location to send the encrypted payload.

* * * * *